United States Patent [19]

Alexander

[11] Patent Number: 4,577,657

[45] Date of Patent: Mar. 25, 1986

[54] MAGNETIC-PNEUMATIC LIQUID LEVEL CONTROL

[76] Inventor: Jack L. Alexander, P.O. Box 1016, Tulsa, Okla. 74101

[21] Appl. No.: 589,177

[22] Filed: Mar. 12, 1984

[51] Int. Cl.[4] .................... F16K 31/08; F16K 31/18; F16K 33/00

[52] U.S. Cl. .................................... 137/448; 251/65

[58] Field of Search ............... 137/426, 434, 386, 448; 251/65; 335/207, 302, 306

[56] References Cited

U.S. PATENT DOCUMENTS 1,894,367 1/1933 Corcoran .......................... 137/434
2,752,932 7/1956 Newboult ............................ 251/65
2,893,427 7/1959 Felgate ................................ 137/448
3,822,933 7/1974 Johnson ................................ 251/65
3,970,099 7/1976 Murphy, Jr. et al. ............. 137/446
4,436,109 3/1984 Taylor ................................. 137/448

*Primary Examiner*—G. L. Walton
*Attorney, Agent, or Firm*—Head, Johnson & Stevenson

[57] ABSTRACT

A liquid level control device including reciprocating magnet shuttle valve means that is moved to control a liquid flow due to the movement of a float lever magnet, magnet means in response to a change in a selected liquid level.

3 Claims, 4 Drawing Figures

MAGNETIC-PNEUMATIC LIQUID LEVEL CONTROL

SUMMARY OF THE INVENTION

It is a primary object of this invention to provide a float control, magnetic-pneumatic snap-acting liquid level control, that can be used in pressurized or enclosed vessels. It is a further object of this invention to provide a control means of such a size that it can be positioned inside of a small size pipe or in the wall of a chamber.

These and other objects are realized and the limitations of the prior art are overcome in this invention both by providing a single structure, or body, which would be a short rod or the like of a selected metal of selected length. There is a first cavity machined into a first end of the body, that is, the end exposed to the liquid, and a float assembly is positioned inside said first cavity.

There is a second cavity in the second end of the body which holds the sensing end control elements. There is a sealed wall between the two cavities. There is a pivoted first arm in the first cavity one end of which is connected to a float and the other end of which carries a first magnet of selected size and construction.

When the body is held in a position whereby the axis of the float arm is horizontal then the magnet face in the end of the float arm is vertical and moves parallel to itself with the face of the magnet close to the sealed wall, the plane of which is perpendicular to the axis of rotation of the float arm.

The second cavity comprises a group of bored openings from the outside surface of the body. A first bore hole is provided radially from the circumference so as to intersect the position of the magnet in the float arm for one extreme position of the float thus. A second magnet is included in the end of a magnet holder, which is controlled to move radially in the first bore hole responsive to the magnetic effect i.e., attract or repel between a second magnet positioned in one end of the holder, and facing the first magnet in the float arm. The second magnet is on the opposite side of the internal wall from the first magnet.

This second borehole of the second cavity, is coaxial with the third borehole which contains a second orifice connected between the second cavity and the atmosphere. The three boreholes are coplanar. A pivoted shuttle rod positioned axially, is controlled at one end by the magnet holder, and at the other end carries a valve seal, which alternately seals first one orifice or the other, as the float moves one way or another.

This causes the pressure in the second cavity to vary from atmospheric, to the pressure of instrument air. This pressure is transmitted from the second cavity to the pilot control of a valve which controls the flow of liquid into the chamber.

BRIEF DESCRIPTION OF THE DRAWINGS

These and other objects and advantages of this invention and a better understanding of the principals and details of the invention will be evident from the following description taken in conjunction with the appended drawings in which.

DESCRIPTION OF THE PREFERRED EMBODIMENT

Figure 1:
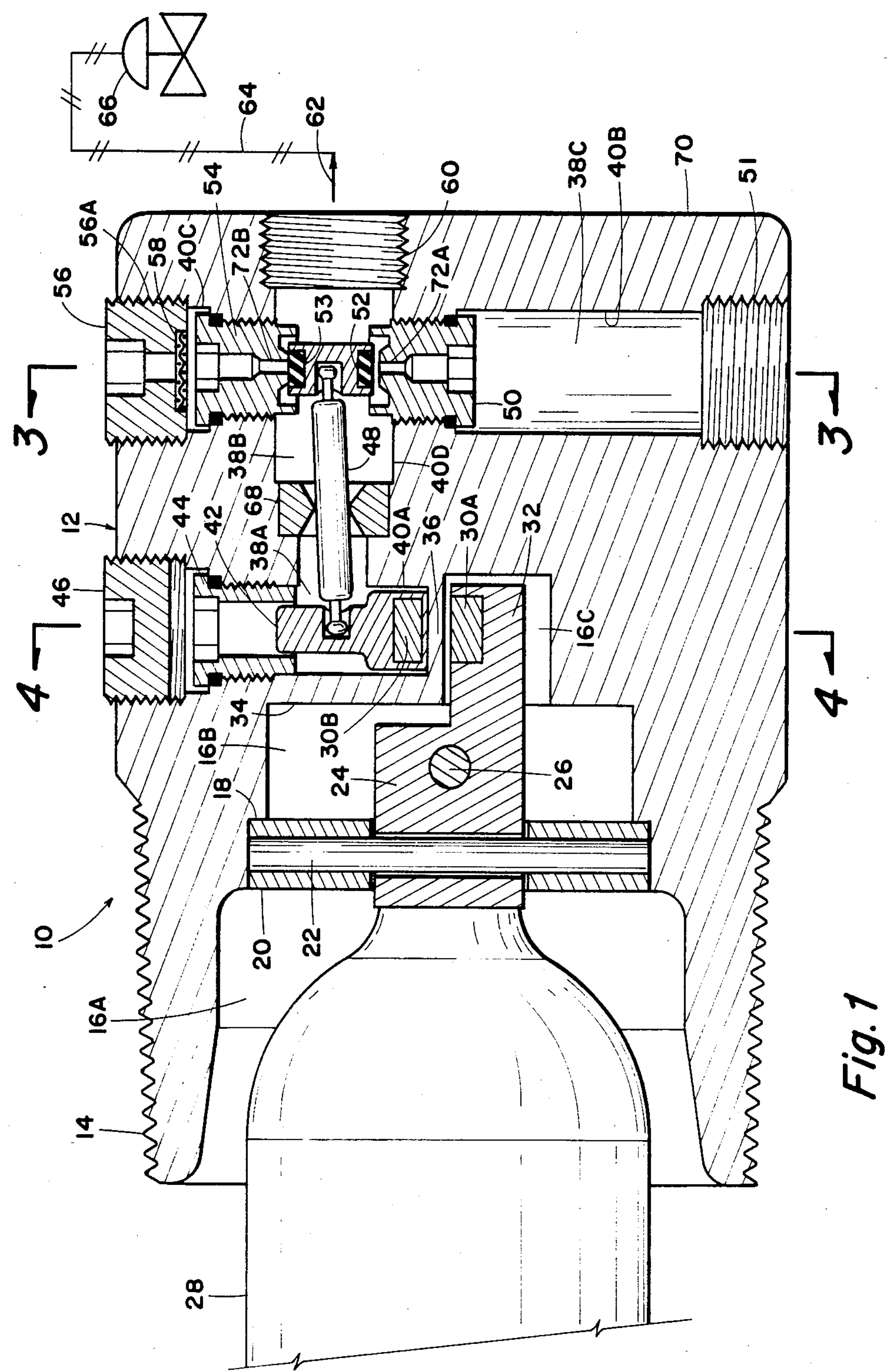
FIG. 1 is a vertical cross section through one embodiment of the invention.

Referring now to the drawings and in particular to FIG. 1 there is shown an overall instrument indicated by the numeral 10, which comprises a body indicated generally by the numeral 12. A first end 14 of the body 12 is threaded and is adapted to be screwed into a standard pipe thread of a selected size. Of course, other means of attachment of the body to a wall of a vessel are inclusive of the invention.

The body 12 is made of a selected material which in non-magnetic, such as brass or stainless steel, for example. A first cavity is machined in a first end 14 of the body,. The first cavity has 3 parts, 16A, 16B and 16C. Each of these three parts of the first cavity are machined through the open first end of the body, either by boring or milling etc.

Figure 2:
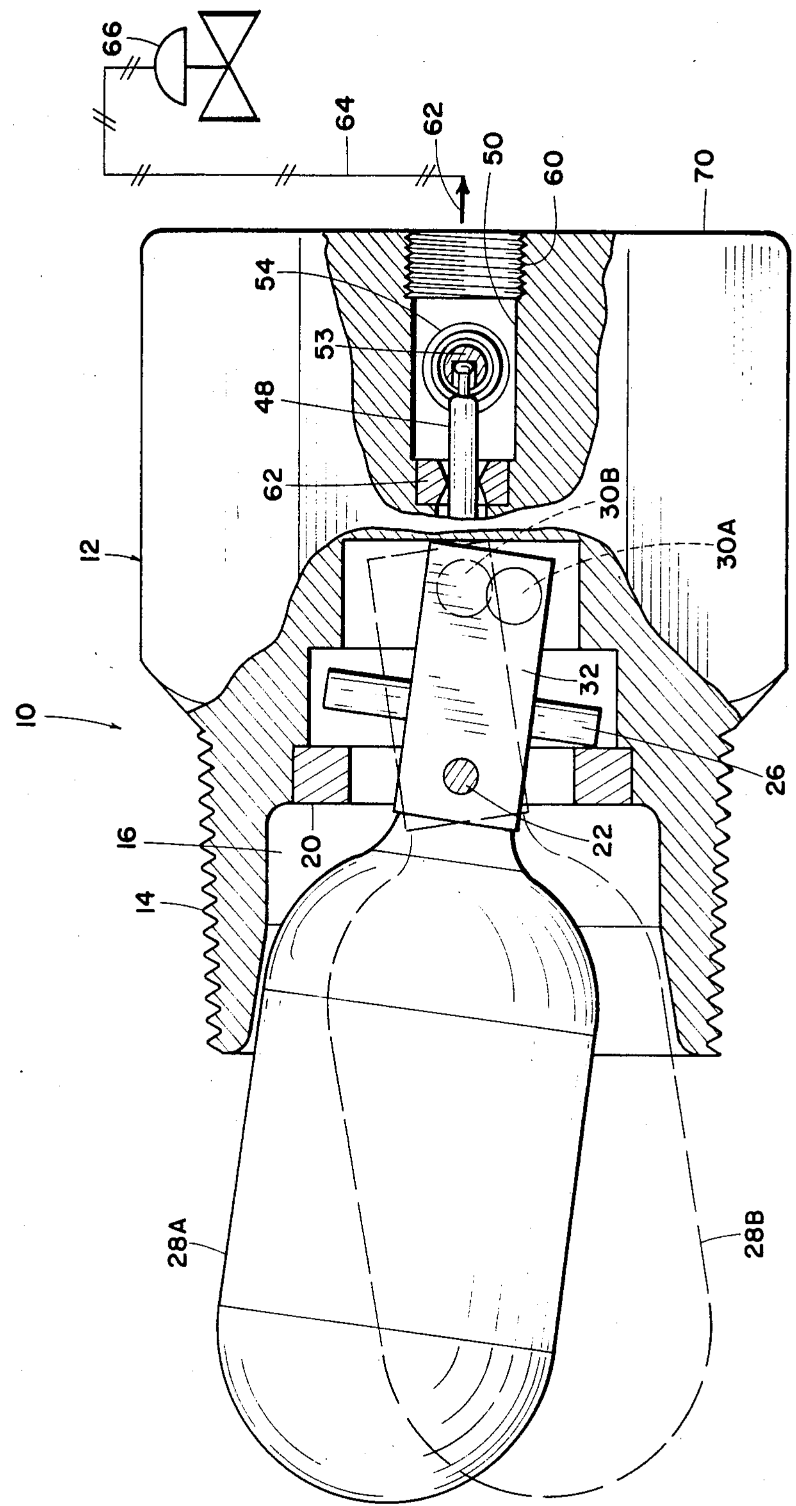
FIG. 2 is a partial cross section taken in a vertical plane.

A shoulder 18 is provided in the cylindrical portion surrounding the cavity 16B. A ring 20 carrying a diametral axle or pivot 22 is provided. A rocker arm or flat arm is pivoted about the pivot rod 22. The float 28 is attached to one end of the float arm 24 and a magnet 30A is provided at the second end of the float arm, all of which is provided to permit the float and float arm to operate as shown in FIG. 2. The float varies from a selected position 28B below the horizontal, to a corresponding position 28A above the horizontal. A mechanical stop 26, shown in FIG. 2, serves to limit the oscillatory angle of the float arm.

It is clear from FIGS. 1 and 2, that the float, float arm magnet pivot ring and pivot and stop, can all be assembled on the bench and then inserted into the first cavity 16. This sub-assembly is positioned by means of the ring from the shoulder 18.

There is a wall 34 and second portion 36 which completely seals the first cavity 16 from a second cavity 38 which is made up of various boreholes which communicate with the second end of the body.

Of course, other mechanical arrangements between the magnets and the float arm and the instrument controls can be arranged, but a wall of selected thickness to withstand any selected pressure which may be present inside the liquid container. The body should also be insensitive to certain chemicals in the liquid in the chamber. Thus by means of the wall 36 which is transparent to magnetic flux, the two environments inside and outside the tank can be quite different.

The first portion 38A of the second cavity is the first cylindrical opening 40A, which is bored radially from the circumference. This opening 40A forms the working space for the magnet holder 42, holding the magnet 30B. It is guided by the cylindrical cavity so that it can slide inwardly and outwardly along the radial path set by the cavity 40A.

Since the faces of the two magnets are parallel to each other and the first magnet is mounted on a pivoted arm the positions of the magnet will change as the angle of the float arm changes. In one position of the float the two magnets can for instance be coaxial with each other but separated by the wall. For another position of the float they can be not only separated axially by the wall but also laterally displaced from each other. By the use of proper magnetic material it is possible to choose an arrangement where, when the two magnets are coaxial there will be a repelling force exerted between them. When they are displaced laterally from each other there will be a force of attration between the two magnets. Thus, as the float arises and falls the two magnets become alternately in coaxial relation or displaced relation. The magnet holder in its guides in the first borehole will move radially away from the wall for example when there is a force of repulsion and move inwardly when there is a lateral displacement or where there is a force of attraction. Thus the radial position of the magnet holder will be a function of the angle of the float arm.

Placed closer to the second end 70 of the body are two other radial bore holes a second and a third. The second borehole 40B is used to supply pressurized instrument control air to a small orifice 72A. Coaxial with this orifice but displaced axially, is another small orifice 72B which is inserted into the third borehole 40C. These two orifices are separated by a selected distance. One, 72A is connected to pressurized instrument air supply and the other one 72B is connected to the atmosphere, for example. The purpose is to control other equipment as a function of the liquid level, which could include control of the liquid itself.

A pivoted shuttle arm 48 is positioned substantially parallel to the axis of the body. One end is positioned in the magnet holder 42 and the other one is positioned in a small cylindrical block which includes on each end, a small cylinder of compliant sealing material. When this arm tilts, the compliant material covers and seals either one or the other of the two orifices 72A or 72B in the second and third boreholes.

To summarize this action; In the first borehole 40A of the second cavity, there is a oscillatory cylindrical rod-like device which is the reciprocating magnet holder 42. It can slide radially, and it moves as a funtion of the magnetic force between the two magnets 30A and 30B, one on the float arm 24 and the other on the end of the magnet holder 42 closes to the wall 36.

There are two other radial boreholes, each with a orifice, one or the other of which can be closed while the other is open and vice versa. A short cylindrical shuttle arm extends from the magnet holder to the orifices, and is pivoted at an intermediate point 68. Thus as the magnet holder moves radially outwardly or inwardly, it will oscillate one end of the pivoted shuttle arm 48, and the opposite end will of course move in the other direction in more or less radial manner. This oscillation of the second end carries the orifice seal first to close off one orifice leaving the other open and vice versa.

There is another part of the second cavity. It is a fourth borehole 40D parallel to the axis of the body. It takes a pipe through which instrument air is carried as shown by arrow 62 and pipe 64, through which the instrument air is carried to a pilot control of a valve 66 which controls the flow of liquid into the chamber. Thus at one position of the magnet holder the instrument air valve or orifice 72A is opened, and the valve 72B venting to the atmosphere is closed. The pressurized air in the second cavity then goes by means of the piping 64 to the control valve 66. The power control valve then starts to fill the tank. When the level gets to the proper point the float shifts to an opposite position the magnets are attracted and the shuttle arm tilts the other way thus closing the instrument air and venting the space in the second cavity and through the outlet pipe to atmospheric pressure.

Figure 3:
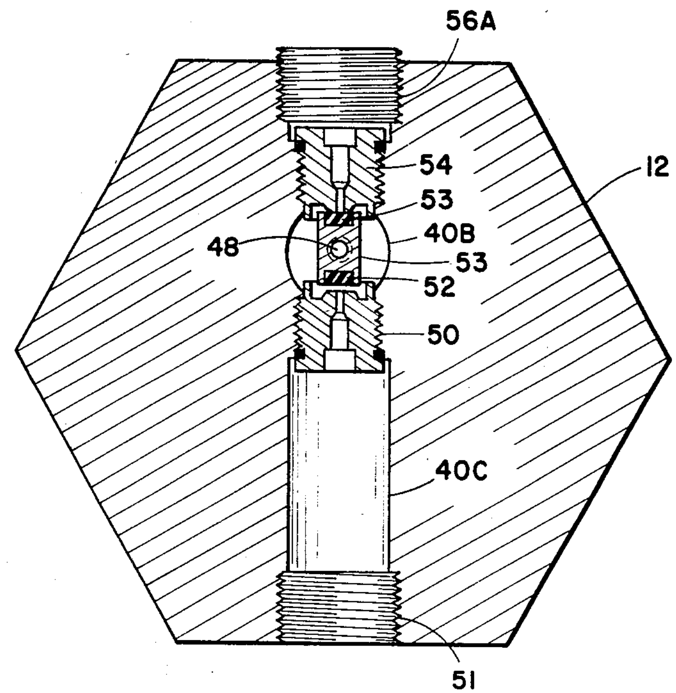
FIG. 3 is a cross section across the plane 3—3 of FIG. 1.
Figure 4:
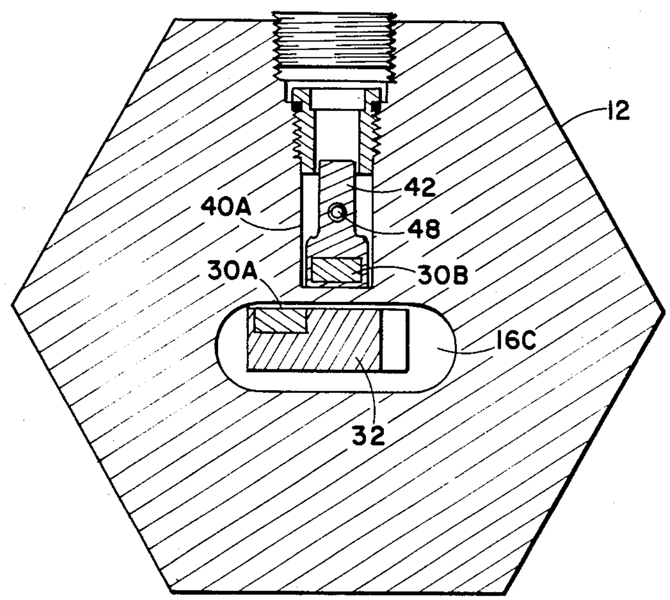
FIG. 4 is a cross section taken across the plane 4—4 of FIG. 1.

FIGS. 3 and 4 show additional cross sections to clarify the relative positions of the various cavities and controls. Since each of the parts shown in FIGS. 3 and 4 have already been described in detail these figures need not be described further.

The use of the magnets permits the operation without direct connection of the float to the control instrumentation, thus permitting the use of the closure wall between the two cavities. Also, the use of the magnets makes a snap action type of operation, which avoids chattering of the air switching control.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A liquid level control means comprising:

(a) body means adapted to be inserted and sealed into the wall of a chamber containing a liquid to be controlled to a selected level; said body having a first end and a second end, each having a cavity of selected size and shape, with a wall sealing between the first cavity in the first end and the second cavity in the second end; said body being positioned in elevation relative to the selected liquid level;

(b) arm means pivotally supported in said first cavity; said arm means having a float on one end and a first magnet on the other end being disposed in a portion of said first cavity, said first magnet positioned to move in a plane that is parallel to the pivotal movement of said float;

(c) reciprocating magnet holder means positioned in a bore of said second cavity defined by the first cavity and the first cavity portion so as to be guided to move perpendicular to said plane of said first magnet; said holder having a second magnet in its end, facing said first magnet with said wall between said first and second magnets; said magnets arranged to attract each other, or to repel each other depending on the position of said float and said first arm;

(d) pivoted shuttle rod means positioned with a first end controlled by the position of said magnet holder; the second end of said pivoted shuttle rod having means to control said selected liquid level.

2. The control means as in claim 1, in which with said float arm in one position said first and second magnets repel each other forcing the magnet holder away from the first magnet and closing a first valve seat and in its other position the two magnets attract each other, forcing said magnet holder toward said first magnet, and opening said first valve seat.

3. The control of claim 1 wherein said shuttle rod means includes a shuttle valve to control instrument air to a means to control said selected level.

* * * * *